March 8, 1932.　　　F. A. GLAPION　　　1,849,004
EXTRICATING DEVICE FOR VEHICLES
Filed April 6, 1929　　　3 Sheets-Sheet 1
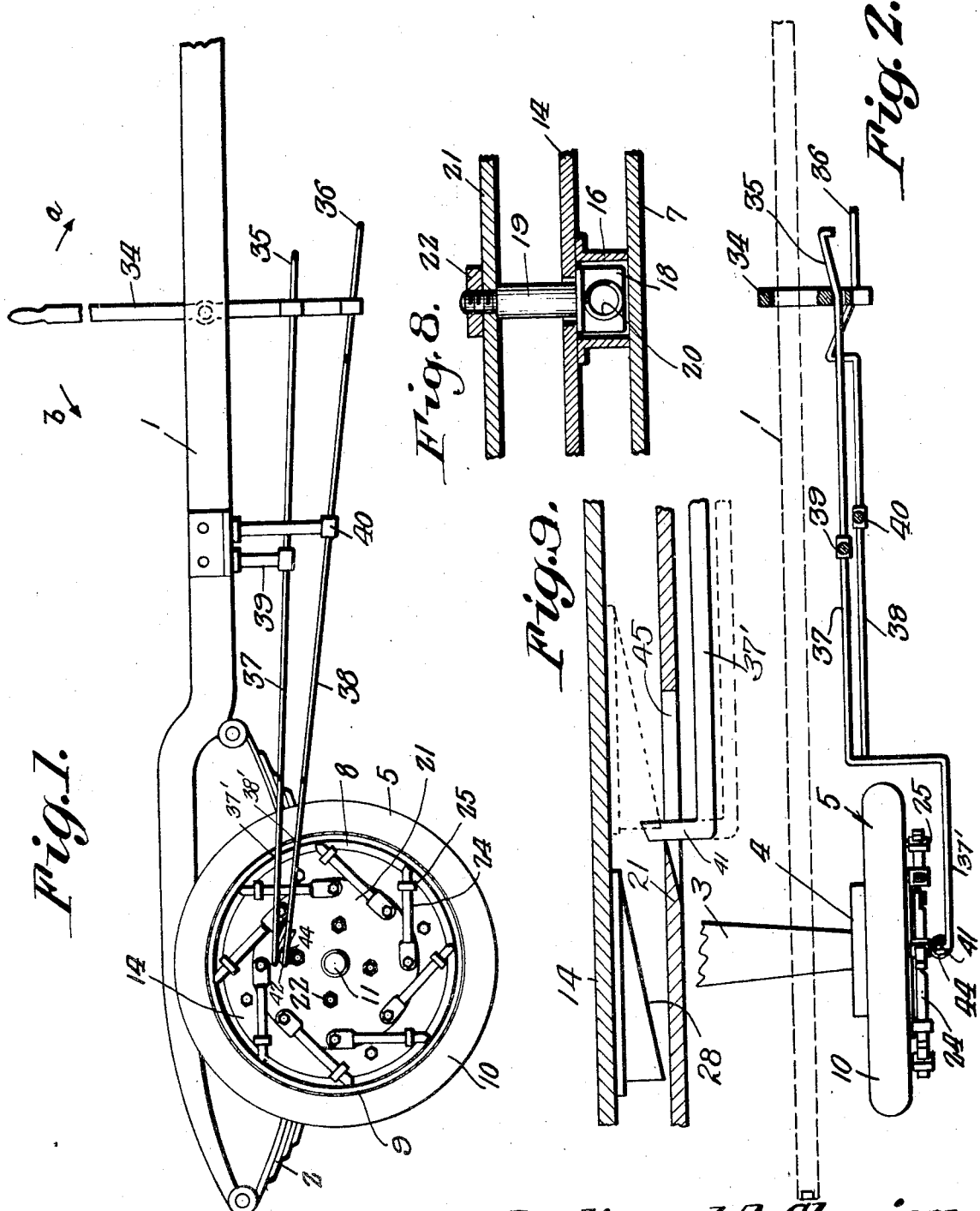

March 8, 1932.  F. A. GLAPION  1,849,004
EXTRICATING DEVICE FOR VEHICLES
Filed April 6, 1929  3 Sheets-Sheet 2
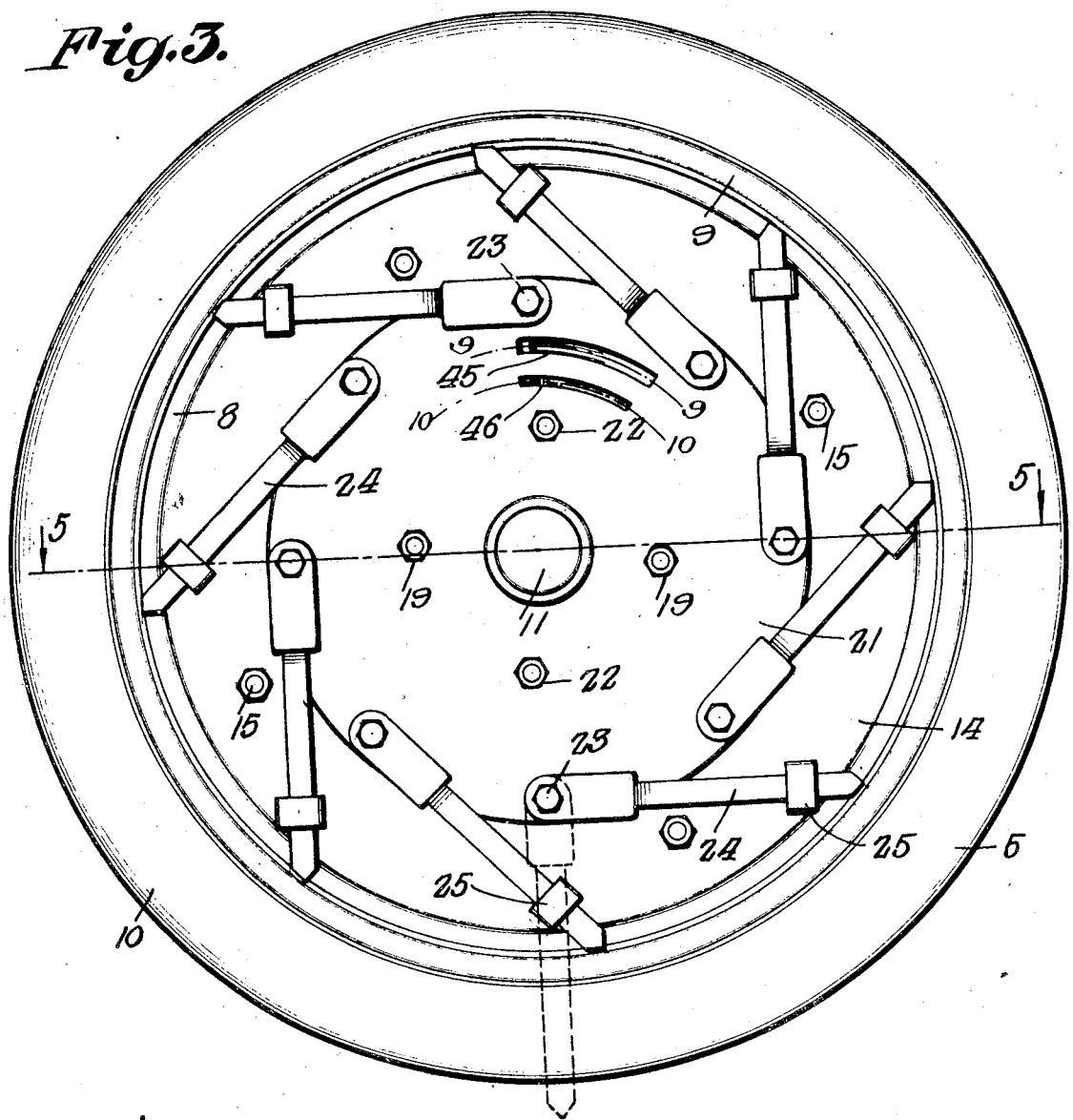
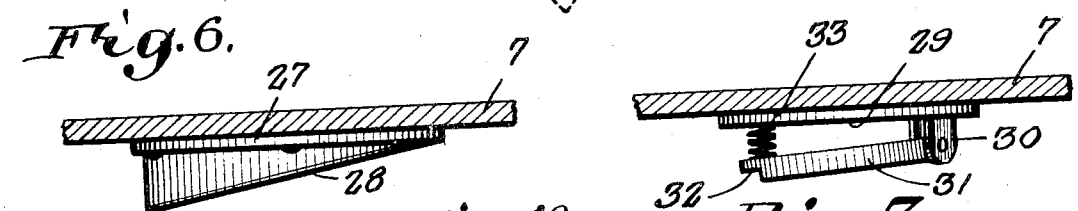
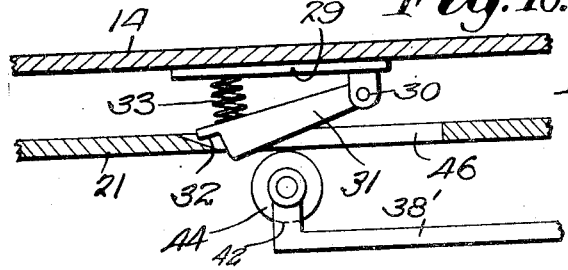
Ferdinand A. Glapion,
INVENTOR
BY Victor J. Evans
ATTORNEY March 8, 1932.  F. A. GLAPION  1,849,004
EXTRICATING DEVICE FOR VEHICLES
Filed April 6, 1929   3 Sheets-Sheet 3

Ferdinand A. Glapion, INVENTOR

BY Victor J. Evans ATTORNEY

Patented Mar. 8, 1932

1,849,004

UNITED STATES PATENT OFFICE

FERDINAND ALBERT GLAPION, OF NEW ORLEANS, LOUISIANA, ASSIGNOR OF ONE-THIRD TO PRISCILLA SARAH WATTERHOUSE, OF NEW ORLEANS, LOUISIANA

EXTRICATING DEVICE FOR VEHICLES

Application filed April 6, 1929. Serial No. 353,099.

My present invention has reference to a vehicle attachment and is designed to provide a means for extricating vehicles should they become stuck in ruts.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of the rear portion of an automobile frame illustrating the application of my improvement.

Figure 2 is a top plan view thereof with parts in section.

Figure 3 is an enlarged side elevation of one of the rear vehicle wheels.

Figure 6 is a sectional view approximately on the line 6—6 of Figure 4.

Figure 7 is a similar sectional view on the line 7—7 of Figure 4.

Figure 8 is a detailed sectional view taken on the line 8—8 of Figure 4.

Figure 9 is a similar view cut on the line 9—9 of Figure 3.

Figure 10 is a similar view cut on the line 10—10 of Figure 3.

Figure 4:
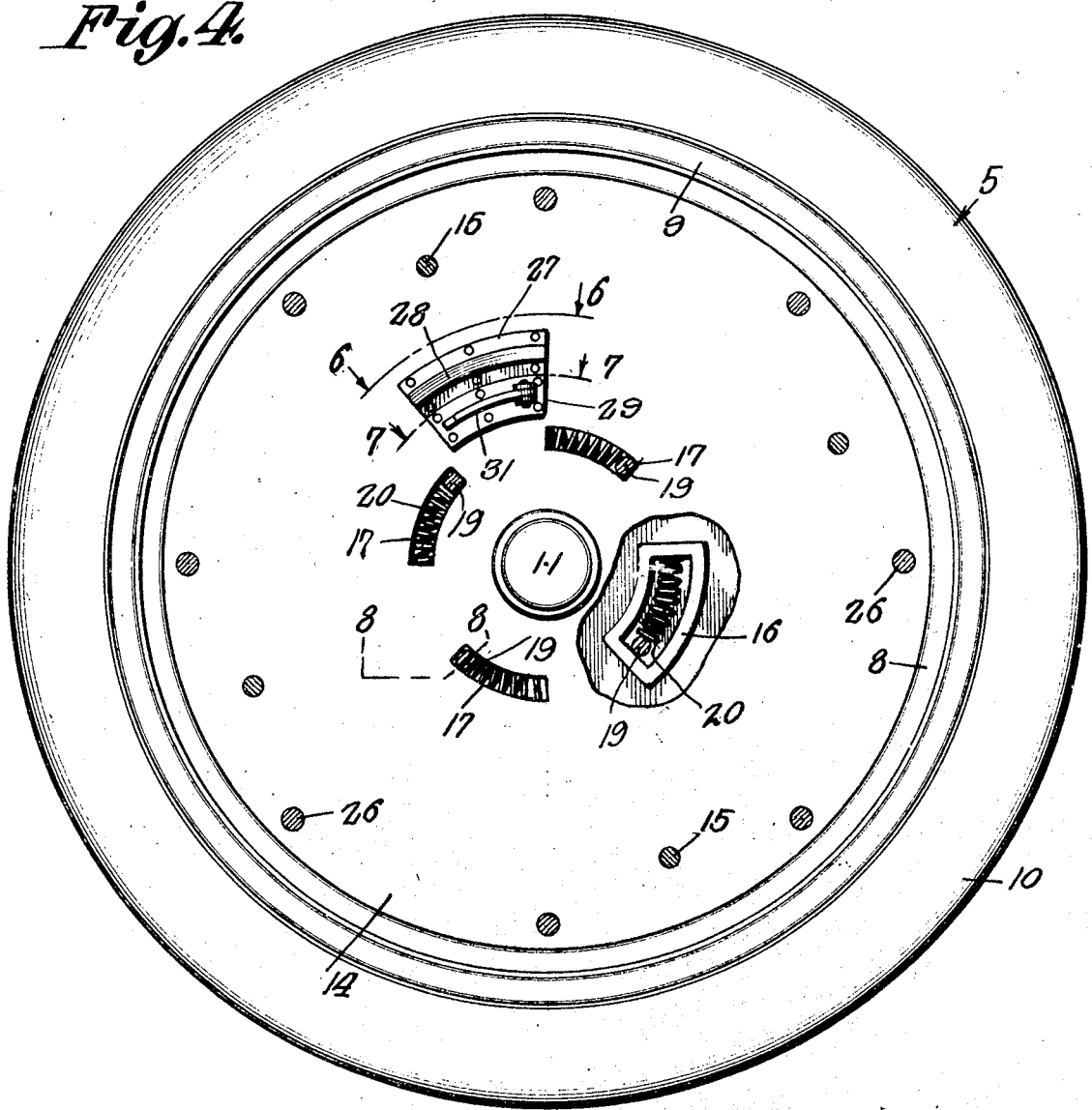
Figure 4 is a similar view with one of the discs removed.
Figure 5:
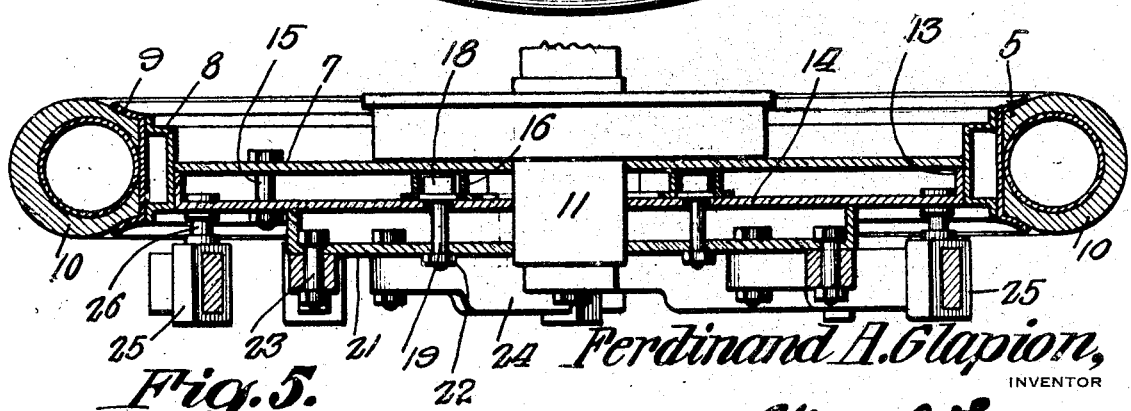
Figure 5 is a sectional view approximately on the line 5—5 of Figure 3.

The frame of the automobile machine is indicated at 1 and the said frame is supported upon springs 2 carrying an axle housing 3 upon which is located a brake drum 4 in the usual manner. A rear wheel 5 is journaled with relation to the housing and brake drum and the said wheel includes a flat disk 7 which is attached to a flanged ring member 8 and the said ring member is carried by a rim 9 upon which is mounted a tire 10 in a usual manner. The wheel 5 is provided with a hub 11 which is held in place by an axle nut. The disk 7 bears against a flange 13 carried by a disk 14 and the said disks are connected together by means of bolts 15. Boxes 16 are mounted between the disks 7 and 14 and each of the said boxes is provided at its side with a slot 17. The boxes 16 receive heads 18 of bolts 19 and springs 20 bear against the sides of the heads 18 and are housed within the boxes. A flanged disk 21 is carried by the bolts 19 and nuts 22 are screwed upon the bolts and bear against the side of the disk 21. Pivot pins 23 are carried by the disk 21 and spurs 24 are pivoted upon the said pins. The spurs 24 pass through boxes 25 which are mounted upon pivot studs 26 carried by the disk 14. A base plate 27 is mounted upon the disk 7 and is provided with an inclined rib 28. An arcuate plate 29 is located adjacent the plate 27 and is provided at one end with outstanding spaced ears 30 between which is pivoted a latch rod 31. The rod 31 is provided with a notch 32 and a spring 33 is interposed between the plate 29 and the free end of the said latch rod. A lever 34 is pivoted upon the frame 1 and its upper end may swing rearwardly as indicated by the arrow $b$ in Figure 1 or forwardly as indicated by the arrow $a$ in said figure. Rods 37 and 38 are provided with angle ends 35 and 36 respectively and the said rods are further provided with offset ends 37' and 38' respectively. The said rods pass through guides 39 and 40 attached to the frame 1. The end portion 37' is provided with an inturned extremity 41 and the end portion 38' is provided with an inturned end portion 42. A roller 44 is journaled upon the inturned end 42 of the portion 38' and may pass along a slot 46 in the disk 21 and engage the end portion of the latch rod 31 as best indicated in Figure 10 of the drawings. The disk 21 is further provided with a slot 45 which receives the inturned end 41 of the portion 37' as best shown in Figure 9 of the drawings whereby the end 41 may engage the rib 28 hereinbefore described.

The slots 45 and 46 have one end wall cut angularly as shown in Figures 9 and 10. The end 41 which passes through the slot 45 has a beveled edge and the roller 44 may be of greater length than the width of the slot 46. The notch 32 will permit the latch member 31 to engage the beveled wall of the slot 46 so that the outer corner of the said latch 31 will project slightly beyond the outer face of the disk 21. When the lever 34 is swung in the direction of the arrow b (Figure 1), both of the rods 37 and 38 will be moved. The rod 38 is moved away from the disk 21, causing the angle end 41 of the rod 37 to enter the slot 45. The inturned end 41 contacts with the rib 28 and partially turns the disk 21, so that the spurs 24 are swung upon their pivots and slide through the boxes 25 so that they will be radially disposed with relation to the wheel 5 and the lower spurs will have contact with and penetrate the ground. During such movement the latch rod 31 is moved partially through the opening 46 so that the notched end thereof will contact with the beveled end of the slot and thereby hold the disk 21 against turning, at the same time the springs 20 are compressed. When the lever 34 is swung in the direction of the arrow a, the roller 44 unlatches the rod 31 and under the influence of the springs 20 the parts are returned to normal positions as shown in Figure 1 of the drawings.

Having described the invention, I claim:

1. A vehicle wheel having a rotatable element thereon, pivoted ground engaging spurs carried by the rotatable element and a side of the wheel, guide means for the spurs, spring means for influencing and retaining the rotatable element in one position to hold the spurs from ground engagement, means for holding the rotatable element when the wheel is turned to project the spurs into ground engagement, latching means for sustaining the element in such position and releasing means for the latching means to permit the springs to return the element to initial position.

2. The combination with a vehicle wheel, of an element pivotally mounted thereon, spurs pivotally connected with the element, swivel guide means carried by the wheel for the spurs, spring means influencing the element to one position to move the spurs inwardly and to cause the element to turn with the wheel, lever operated means for temporarily holding the element from rotating with the wheel, to cause the spurs to be projected into ground engagement, latching means for holding the element locked to the wheel, and means, actuated by the lever for releasing the latching means to permit of the springs returning the element to initial position.

3. A vehicle wheel having spaced face plates which are connected, spaced segmental boxes between the plates, bolts having their heads received in said boxes, spring means influencing the bolts to one end of the boxes, a segmental cam rib carried by the outer face plate, a spring influenced latch also carried by the outer face plate, a disc mounted to turn on the outer face plate and engaged by the spring influenced bolts and having arcuate recesses in a line with the cam rib and with the latch, spurs pivotally secured to the disc, swivel guides on the wheel for the spurs, lever operated means for engaging with the cam rib, for temporarily holding the disc from turning with the wheel, and to permit of the latching means engaging with one wall of the disc for locking the same from turning with the wheel, whereby to project the spurs into ground engagement, and means also carried by the lever engageable with the latch to release the disc and to permit of the spring influenced bolts returning the same to initial position.

4. A vehicle wheel including a tire carrying disk and an outer disk secured to but spaced therefrom, spring influenced circumferentially movable bolts carried by the outer disc and movable through arcuate openings therein, an arcuate cam rib on said disc, an arcuate spring influenced latch on said disk, a flanged disk turnably mounted on the outer disk, having arcuate slots for the rib and latch, ground engageable spurs pivoted to the turnable disk and guided through pivoted bearings on the outer disk, and lever operated rods, one of which is engageable with the high end of the rib, when the lever is in one position, and the other engageable with and designed to force the latch out of latching engagement with the turnable disk when the lever is swung in a second direction.

In testimony whereof I affix my signature.

FERDINAND ALBERT GLAPION.